United States Patent
Jalal et al.

(10) Patent No.: US 11,188,377 B2
(45) Date of Patent: Nov. 30, 2021

(54) WRITING ZERO DATA

(71) Applicant: Arm Limited, Cambridge (GB)

(72) Inventors: Jamshed Jalal, Austin, TX (US); Mark David Werkheiser, Austin, TX (US); Phanindra Kumar Mannava, Austin, TX (US); Bruce James Mathewson, Papworth Everard (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 16/592,979

(22) Filed: Oct. 4, 2019

(65) Prior Publication Data

US 2021/0103460 A1    Apr. 8, 2021

(51) Int. Cl.
| | |
|---|---|
| *G06F 12/0891* | (2016.01) |
| *G06F 12/0808* | (2016.01) |
| *G06F 9/46* | (2006.01) |
| *G06F 9/455* | (2018.01) |
| *G06F 13/40* | (2006.01) |
| *G06F 12/10* | (2016.01) |
| *G06F 9/38* | (2018.01) |

(52) U.S. Cl.
CPC ............ *G06F 9/466* (2013.01); *G06F 9/3816* (2013.01); *G06F 9/45558* (2013.01); *G06F 12/0891* (2013.01); *G06F 12/10* (2013.01); *G06F 13/4022* (2013.01); *G06F 12/0808* (2013.01)

(58) Field of Classification Search
CPC .......................... G06F 12/0891; G06F 12/0808
See application file for complete search history.

(56) References Cited

U.S. PATENT DOCUMENTS

| | | |
|---|---|---|
| 5,737,744 A | 4/1998 | Callison et al. |
| 10,318,178 B1 | 6/2019 | Feng et al. |
| 2007/0113020 A1* | 5/2007 | Gunna .................. G06F 9/383 711/141 |
| 2009/0210595 A1 | 8/2009 | Chaussade |
| 2014/0230077 A1* | 8/2014 | Muff .................. G06F 12/1475 726/30 |
| 2018/0285288 A1* | 10/2018 | Bernat ................ G06F 12/0822 |
| 2019/0179560 A1* | 6/2019 | Moon .................. G06F 3/0619 |

FOREIGN PATENT DOCUMENTS

EP    0 632 379    1/1995

OTHER PUBLICATIONS

Combined Search and Examination Report for GB Application No. 2013199.1 dated Jan. 14, 2021, 6 pages.

* cited by examiner

*Primary Examiner* — Zachary K Huson
(74) *Attorney, Agent, or Firm* — Nixon & Vanderhye P.C.

(57) ABSTRACT

Apparatuses, methods of operating apparatuses, interconnects for connecting apparatuses to one another, and methods of operating the interconnects are disclosed. A master apparatus can issue an individual all-zero-data write transaction specifying a data storage location to the interconnect, which conveys the individual all-zero-data write transaction to a target device which writes all-zero-data at the data storage location. No write data is conveyed with the individual all-zero-data write transaction, so that the individual all-zero-data write transaction may be used to clear the data storage location without adding to congestion of a write data channel in the interconnect.

17 Claims, 11 Drawing Sheets

WRITING ZERO DATA

TECHNICAL FIELD

The present disclosure relates to data processing. In particular, the present disclosure relates to transactions carried on an interconnect.

DESCRIPTION

The interconnect of a data processing system may be required to carry a great variety of transactions between the components of the system which the interconnect connects to one another. These may include write transactions, read transactions, data coherency commands, and so on. Various interconnect transactions carry data, for example transmitted via a dedicated data bus, either as a result of a read transaction (transmitting that data to the device which issued the read transaction) or write data (transmitting that data from the device which issued the write transaction to the destination at which that data should be written). Accordingly, as the scale and complexity of such data processing systems increases and as the interconnect connects ever more devices together, the transport of read and write data around the data processing system can become a significant factor in terms of bandwidth and power consumption for the data processing system.

SUMMARY

In one example embodiment described herein there is an apparatus comprising: an interconnect interface; and interconnect protocol signal generation circuitry, wherein the interconnect protocol signal generation circuitry is arranged to provide an individual all-zero-data write transaction specifying a data storage location to the interconnect interface, and the interconnect interface is responsive to provision of the individual all-zero-data write transaction to cause transmission of the individual all-zero-data write transaction via an interconnect to a target device which comprises the data storage location to cause the target device to write all-zero-data at the data storage location.

In one example embodiment described herein there is an apparatus comprising: an interconnect interface; and interconnect protocol signal reception circuitry, wherein the interconnect protocol signal reception circuitry is responsive to an individual all-zero-data write transaction specifying a data storage location in the apparatus received from the interconnect interface to write all-zero data at the data storage location.

In one example embodiment described herein there is an interconnect system comprising: a master device; an interconnect; and a slave device, wherein the interconnect is responsive to reception from the master device of an individual all-zero-data write transaction specifying a data storage location in the slave device to convey the individual all-zero-data write transaction to the slave device to cause the slave device to write all-zero data at the data storage location.

In one example embodiment described herein there is a method of operating an interconnect system comprising the steps of: receiving in an interconnect an individual all-zero-data write transaction from a master device specifying a data storage location in a slave device; and conveying the individual all-zero-data write transaction to the slave device to cause the slave device to write all-zero data at the data storage location.

In one example embodiment described herein there is a method of operating an apparatus comprising the steps of: generating an individual all-zero-data write transaction specifying a data storage location; providing the individual all-zero-data write transaction to an interconnect interface; and transmitting the individual all-zero-data write transaction via an interconnect to a target device which comprises the data storage location to cause the target device to write all-zero-data at the data storage location.

BRIEF DESCRIPTION OF THE DRAWINGS

The present invention will be described further, by way of example only, with reference to embodiments thereof as illustrated in the accompanying drawings, in which.

DESCRIPTION OF EXAMPLE EMBODIMENTS

Figure 1A:
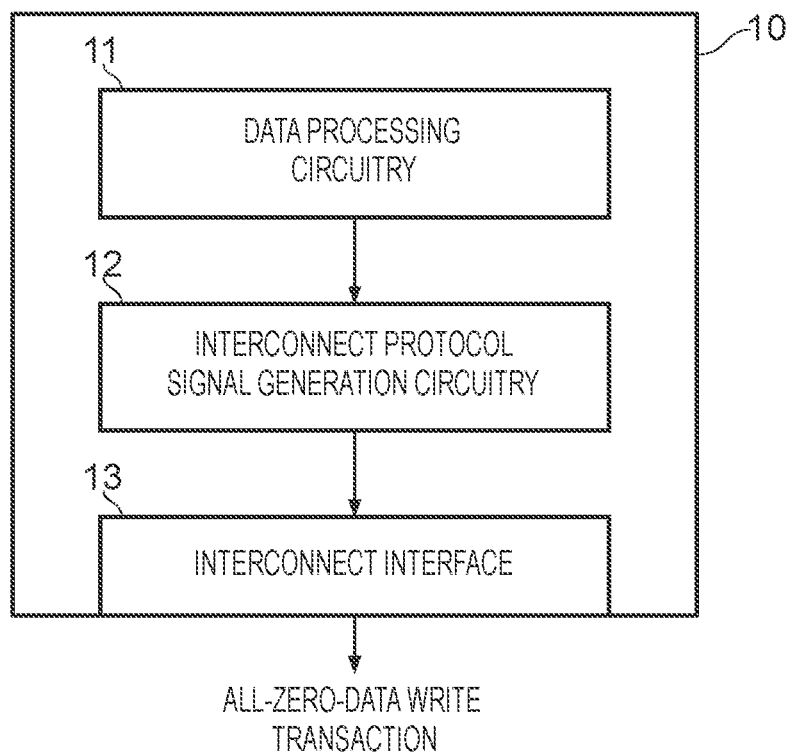
FIG. 1A schematically illustrates an apparatus arranged to generate an all-zero-data write transaction according to some embodiments.

Before discussing the embodiments with reference to the accompanying figures, the following description of embodiments is provided.

In accordance with one example configuration there is provided an apparatus comprising: an interconnect interface; and interconnect protocol signal generation circuitry, wherein the interconnect protocol signal generation circuitry is arranged to provide an individual all-zero-data write transaction specifying a data storage location to the interconnect interface, and the interconnect interface is responsive to provision of the individual all-zero-data write transaction to cause transmission of the individual all-zero-data write transaction via an interconnect to a target device which comprises the data storage location to cause the target device to write all-zero-data at the data storage location.

Accordingly by the use of the individual all-zero-data write transaction, the apparatus can cause "all-zero" data to be written at the specified data storage location. Hence, by contrast to a regular write transaction, which specifies both the data storage location and explicitly provides the data to be written at that data storage location, the apparatus needs only to transmit the individual all-zero-data write transaction specifying this type of write transaction and specifying the data storage location, and no explicit data provision is required. As a result, the recipient of the transaction (i.e. the target device where the data storage location is to be found) can then respond by fully zeroing the data storage location, without requiring the explicit provision of any data (such as a full set of zeros corresponding to the capacity of the data storage location). This provides an efficient mechanism for zeroing specified data storage locations, which in particular does not require a data to be transmitted between the issuer of the transaction and its recipient. This is beneficial in many data processing contexts since data bandwidth is often at a premium and furthermore the power consumed by the data processing system is reduced (with respect to regular data write transactions) since the data bus is not used.

The all-zero-data write transaction may find applicability in a wide variety of situations, but in some embodiments the apparatus further comprises data processing circuitry to perform data processing operations, wherein the data processing operations comprise access to the data storage location, and wherein when the data processing operations undergo a context switch from a first context to a second context the data processing circuitry is responsive to the context switch to control the interconnect protocol signal generation circuitry to provide the individual all-zero-data write transaction specifying the data storage location to the interconnect interface. The use of the all-zero-data write transaction thus supports the security of data handled by the data processing operations in the first context, ensuring that the data storage location is fully zeroed when the data processing operations undergo the context switch from the first context to a second context.

In some embodiments the data processing operations of the first context comprise access to multiple data storage locations, and wherein when the data processing operations undergo the context switch from the first context to the second context the data processing circuitry is responsive to the context switch to control the interconnect protocol signal generation circuitry to provide one or more individual all-zero-data write transactions specifying the multiple data storage locations to the interconnect interface. Accordingly all-zero-data write transactions can thus be used to efficiently zero all data storage locations used by the data processing operations in the first context when it switches to the second context. The security of the data accessed by these data processing operations in the first context is thus ensured with respect to the second context.

The context switch may take a variety of forms but in some embodiments the context switch comprises at least one of: a process switch; a thread switch; a switch to a virtual machine; and a switch from a secure context to a non-secure context. The present techniques are not limited to use within any particular variety of context switch and the ability to efficiently clear data storage location(s) may find applicability in a wide range of situations.

The target of the all-zero-data write transaction may be variously specified and the data storage location may be an individual data storage location having the smallest addressable granularity of the data processing system, whilst in other examples the transaction may specify multiple memory addresses. Accordingly in some embodiments the interconnect protocol signal generation circuitry is arranged to provide the individual all-zero-data write transaction specifying a set of memory addresses which comprises the data storage location. Thus all memory addresses within the set of memory addresses will be caused to be zeroed when the all zero data write transaction is received.

The set of memory addresses may be variously defined but in some embodiments the set of memory addresses corresponds to a cache line which comprises the data storage location.

The transaction may variously specify multiple memory addresses, where these may be individually specified or in some embodiments the interconnect protocol signal generation circuitry is arranged to provide the individual all-zero-data write transaction specifying a memory address range which comprises the data storage location. Accordingly any memory address which falls within the specified memory address range will be caused to be zeroed when the all-zero-data write transaction is received.

In some embodiments the data processing circuitry is arranged to access the data storage location in the data processing operations in dependence on an address translation definition in an address translation cache, and wherein the data processing circuitry is further responsive to the context switch to cause the address translation definition for the data storage location to be invalidated. Thus by the above-described mechanism, it can be provided that the memory location is both cleared (zeroed) and invalidated when the context switch takes place, thus further supporting the security demarcation between the first context and the second context.

The apparatus may be provided within a data processing system with multiple master devices sharing access to certain data storage locations and thus coherency operations may be implemented in order to ensure data coherency across the distributed system. Against this background in some embodiments the interconnect protocol signal generation circuitry is arranged to provide the individual all-zero-data write transaction as an individual all-zero-data write-unique transaction specifying the data storage location to the interconnect interface, and wherein the interconnect interface is responsive to provision of the individual all-zero-data write-unique transaction to cause transmission of the individual all-zero-data write-unique transaction via the interconnect to the target device to cause snoop operations in the interconnect to be carried out with respect to any copies of data from the data storage location which are held in other devices connected to the interconnect. The provision of this particular type of the transaction provided by the present techniques thus enables the apparatus to specify certain transactions, in particular relating to certain data storage locations, for which snoop operations are required to be carried out.

Equally, in some embodiments the interconnect protocol signal generation circuitry is arranged to provide the individual all-zero-data write transaction as an individual all-zero-data write-no-snoop transaction specifying the data storage location to the interconnect interface, and wherein the interconnect interface is responsive to provision of the individual all-zero-data write-no-snoop transaction to cause transmission of the individual all-zero-data write-no-snoop transaction via the interconnect to the target device without triggering snoop operations in the interconnect. Thus this variety of the transaction of the present techniques enables the apparatus to explicitly specify that snoop operations are not required. In a cache coherent data processing system with multiple mutually interacting devices some cache coherency operations will be required, but in certain areas of the system they are not. These cache coherency operations themselves require various transactions to be exchanged by the system components, thus adding to the total transaction bandwidth consumption and where possible it is beneficial to avoid adding to this this bandwidth consumption. Thus an efficient transactional basis for these regions is supported by the write-no-snoop variety of the transaction of the present techniques, which does not trigger snoop operations in the interconnect.

The interconnect may convey the all-zero-data write transaction in a variety of ways, but in some embodiments a predefined set of signals within the multiple paths of the interconnect can be used to specify an "opcode", i.e. a unique combination of signals (a bit pattern) defining the nature of the transaction. Accordingly in some embodiments the interconnect protocol signal generation circuitry is arranged to provide the individual all-zero-data write transaction by asserting a predetermined opcode amongst signals provided to the interconnect interface.

In accordance with one example configuration there is provided an apparatus comprising: an interconnect interface; and interconnect protocol signal reception circuitry, wherein the interconnect protocol signal reception circuitry is responsive to an individual all-zero-data write transaction specifying a data storage location in the apparatus received from the interconnect interface to write all-zero data at the data storage location.

Thus the apparatus which receives the all-zero-data write transaction is communicated to efficiently, since it only requires an identification of the nature of the transaction (i.e. that it is an "all-zero-data write" transaction) and the specified data storage location, and in response it writes all-zero data at the data storage location. It is therefore to be noted that when this type of interconnect transaction is received the recipient disregards any data provided on a write data bus, since this is not required for the transaction specified to be carried out.

In accordance with one example configuration there is provided an interconnect system comprising: a master device; an interconnect; and a slave device, wherein the interconnect is responsive to reception from the master device of an individual all-zero-data write transaction specifying a data storage location in the slave device to convey the individual all-zero-data write transaction to the slave device to cause the slave device to write all-zero data at the data storage location.

In some embodiments the interconnect system further comprises: an intermediate hub device coupled to the interconnect, wherein the interconnect is responsive to reception from the master device of the individual all-zero-data write transaction to convey the individual all-zero-data write transaction to the intermediate hub device, and the intermediate hub device is responsive to reception from the master device of the individual all-zero-data write transaction to convey the individual all-zero-data write transaction to the slave device.

In some embodiments the master device is arranged to provide the individual all-zero-data write transaction as an individual all-zero-data write-unique transaction specifying the data storage location, and wherein the intermediate hub device is responsive to reception from the master device of the individual all-zero-data write-unique transaction to participate in snoop operations in the interconnect with respect to any copies of data from the data storage location which are held in other devices connected to the interconnect.

In some embodiments the master device is arranged to provide the individual all-zero-data write transaction as an individual all-zero-data write-no-snoop transaction specifying the data storage location, and wherein the intermediate hub device is responsive to reception from the master device of the individual all-zero-data write-no-snoop transaction to transmit the individual all-zero-data write-no-snoop transaction via the interconnect to the slave device without triggering snoop operations in the interconnect.

In some embodiments the intermediate hub device is responsive to reception from the master device of the individual all-zero-data write-unique transaction to transmit an individual all-zero-data write-no-snoop transaction via the interconnect to the slave device. Thus where the intermediate hub device may be connected to multiple master devices, each of which could potentially have locally cached copies of data retrieved from the data storage location, the intermediate hub device can cause any required snoop operations and cache coherency operations to be carried out in response to reception of the all-zero-data write-unique transaction. However, the slave device may be "beyond the point of coherency" in the system, and thus snoop operations and cache coherency operations are not required with respect to transactions between the intermediate hub device and the slave device. In this situation the intermediate hub device can then transmit the individual all-zero-data write-no-snoop transaction to the slave device, such that no (further) snoop operations and cache coherency operations are triggered by the transmission of the transaction to the slave device.

The interconnect may provide a connection between a wide variety of interacting components, but in some embodiments the interconnect forms a component interconnect of at least one of: a mesh interconnect topology; an intra-chip communication link; and an inter-chip communication link.

In accordance with one example configuration there is provided a method of operating an interconnect system comprising the steps of: receiving in an interconnect an individual all-zero-data write transaction from a master device specifying a data storage location in a slave device; and conveying the individual all-zero-data write transaction to the slave device to cause the slave device to write all-zero data at the data storage location.

In accordance with one example configuration there is provided a method of operating an apparatus comprising the steps of: generating an individual all-zero-data write transaction specifying a data storage location; providing the individual all-zero-data write transaction to an interconnect interface; and transmitting the individual all-zero-data write transaction via an interconnect to a target device which comprises the data storage location to cause the target device to write all-zero-data at the data storage location.

Particular embodiments will now be described with reference to the figures.

FIG. 1A schematically illustrates an apparatus 10 in some embodiments. The apparatus comprises data processing circuitry 11 which performs data processing operations and has control over the interconnect protocol signal generation circuitry 12. This interconnect protocol signal generation circuitry 12 is arranged to provide the interconnect interface 13 with transactions to be conveyed via the interconnect (not shown in FIG. 1A) to which the interconnect interface 13 is connected. The data processing circuitry 11 can in particular cause the interconnect protocol signal generation circuitry 12 to generate an all-zero-data write transaction to be passed via the interconnect interface 13 onto the interconnect and thereby conveyed to a specified target of the transaction. The data processing circuitry 11 can thus make use of this all-zero-data write transaction to specify a data storage location in the data processing system of which the apparatus 10 forms part, wherein in response to reception of this transaction the target device comprising the data storage location will write all-zero data at that data storage location.

Figure 1B:
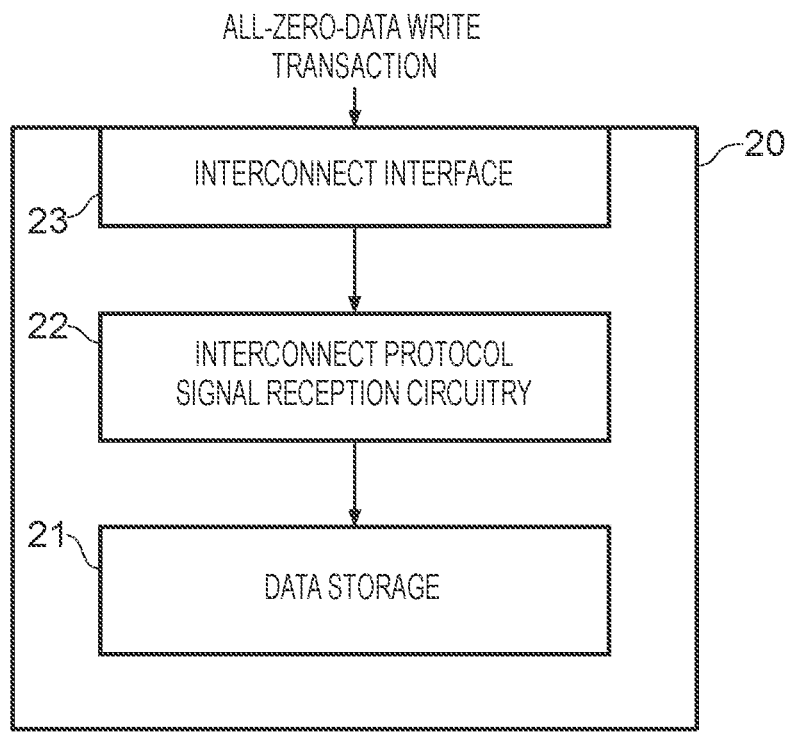
FIG. 1B schematically illustrates an apparatus arranged to receive an all-zero-data write transaction according to some embodiments.

FIG. 1B schematically illustrates an apparatus 20 in some embodiments. Apparatus 20 is a slave device in a data processing system such that it is arranged to receive transactions from other (master) devices, such as the apparatus 10 of FIG. 1A, and to allow those master devices access to the data which it stores. The apparatus 20 comprises data storage 21 which is accessed by other (master) apparatus devices in the data processing system. The apparatus 20 comprises an interconnect interface 23 which receives transactions from the interconnect (not shown in FIG. 1B) to which it is coupled and it passes these to the interconnect protocol signal reception circuitry 22 of the apparatus 20. The interconnect protocol signal reception circuitry 22 interprets transactions received via the interconnect interface 23 and conveys required information to the data storage 21. In particular the apparatus 20 of FIG. 1B is arranged to receive an all-zero-data write transaction via the interconnect interface 23 and when this type of transaction is identified by the interconnect protocol signal reception circuitry 22 it causes the data storage location specified in the transaction to have all-zero data written to it in the data storage 21.

Figure 2:
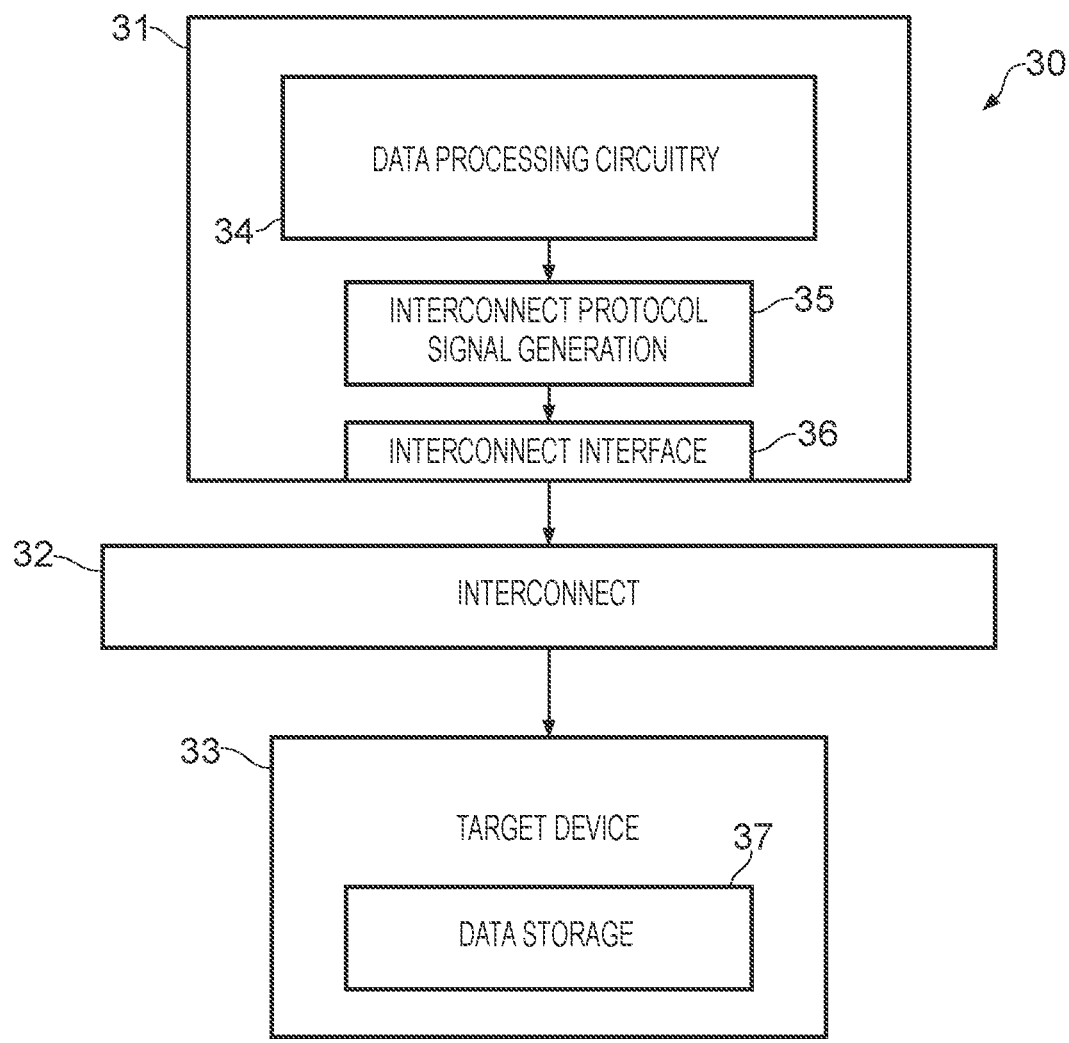
FIG. 2 schematically illustrates a data processing system in which an interconnect is arranged to convey an all-zero-data write transaction from a master device to a slave device in some embodiments.

FIG. 2 schematically illustrates a data processing system 30 comprising a master device 31, an interconnect 32 and a target (slave) device 33. The master device 31 may for example be provided by the apparatus 10 of FIG. 1A and the target device 33 may for example be provided by the apparatus 20 of FIG. 1B. The apparatus 31 comprises data processing circuitry 34 to perform data processing operations and further comprises interconnect protocol signal generation circuitry 35 and interconnect interface 36. The data processing circuitry 34 has control over the interconnect protocol signal generation circuitry 35 and can thus cause a number of different transactions to be passed via the interconnect interface 36 onto the interconnect 32, via which they are then conveyed to their respective targets. Target device 33 represents such a target and comprises data storage 37, wherein the data processing operations of the data processing circuitry 34 of the apparatus 31 access the data storage 37. The apparatus 31 of FIG. 2 is in particular arranged such that the data processing circuitry 34 can cause the interconnect protocol signal generation circuitry 35 to generate an individual all-zero-data write transaction which specifies a data storage location in the data storage 37 of the target device 33. This transaction is conveyed via the interconnect 32 to the target device 33 and in response the target device 33 writes all-zero data to the specified data storage location in the data storage 37. Thus, the master device 31 has an efficient mechanism by which it can cause specified locations in the data storage 37 to be cleared (zeroed), without requiring any explicit data values (e.g. a set of zeros) to be conveyed by the interconnect 32. That is to say, the provision of the all-zero-data write transaction itself, regardless of the state of any data write bus, is sufficient to cause the target device to zero the data storage location. This is of particular benefit, because there may be several other master devices connected to the interconnect accessing this target device and also other slave devices in the data processing system. Accordingly the data carrying bandwidth of the interconnect 32 could easily become congested. The all-zero-data write transaction of the present techniques does not contribute to any data bandwidth congestion, because no data is required to be conveyed with the transaction.

Figure 3:
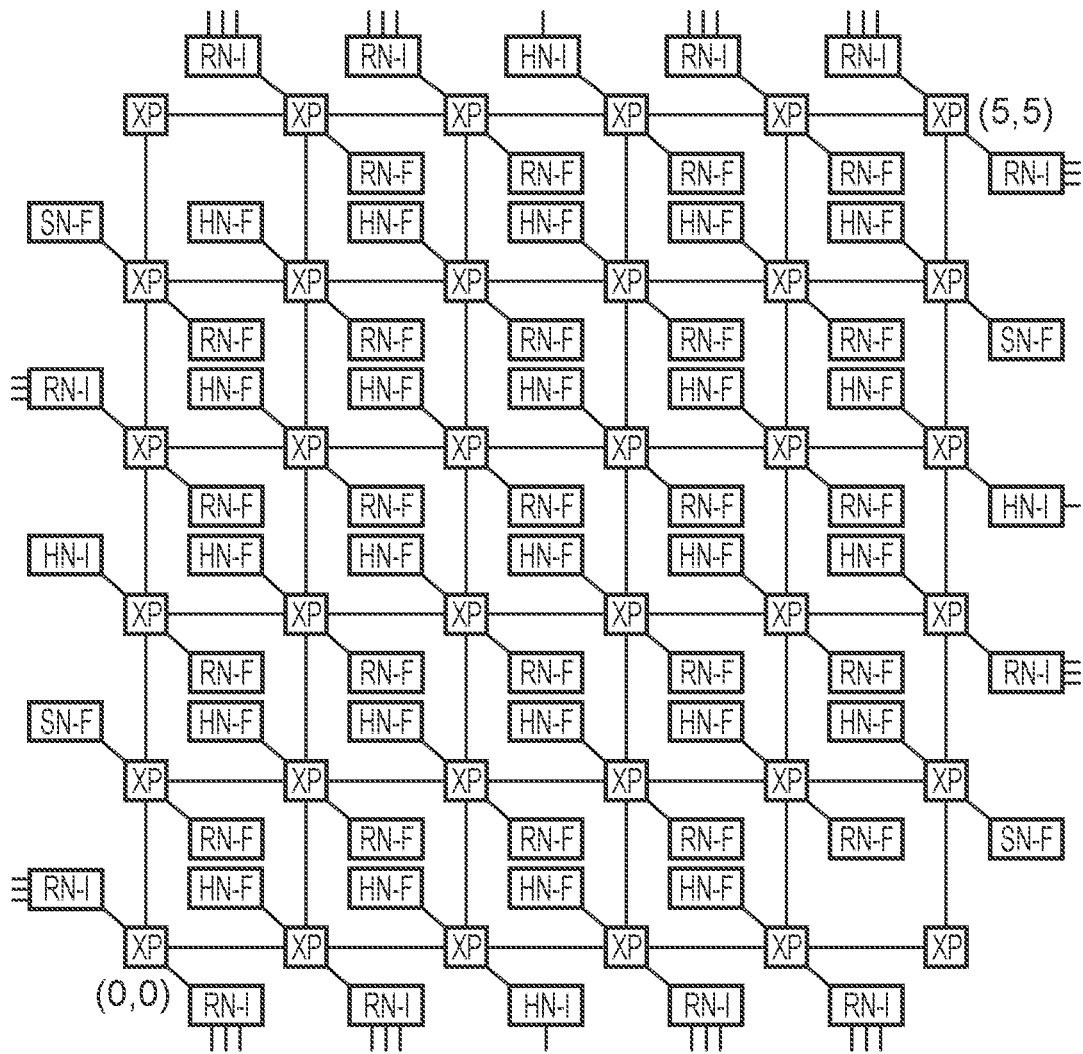
FIG. 3 schematically illustrates a 6×6 mesh topology interconnect in some embodiments.

The potential for data bandwidth congestion can grow significantly in a data processing system with multiple master devices and multiple slave devices. FIG. 3 schematically illustrates an example data processing system in which the interconnect is provided in a 6×6 mesh topology (where nodes of the interconnect are labelled "XP"), with 36 master devices (requester nodes—RN), 28 intermediate devices (home nodes—HN), and four slave devices (slave nodes—SN) sharing the interconnect channels. The nodes of the system shown in FIG. 3 are further labelled as "—F" (fully coherent) or "I" (I/O coherent) and thus in addition to the data transactions required in the system to support the numerous data processing operations being carried out, data may also be required to be transferred around the system in support of the coherency operations. In this context, the ability for a requesting device (master) to clear (zero) a specified data storage location without having to provide explicit zero data as part of the transaction is of significant benefit in reducing data channel congestion.

Figure 4:
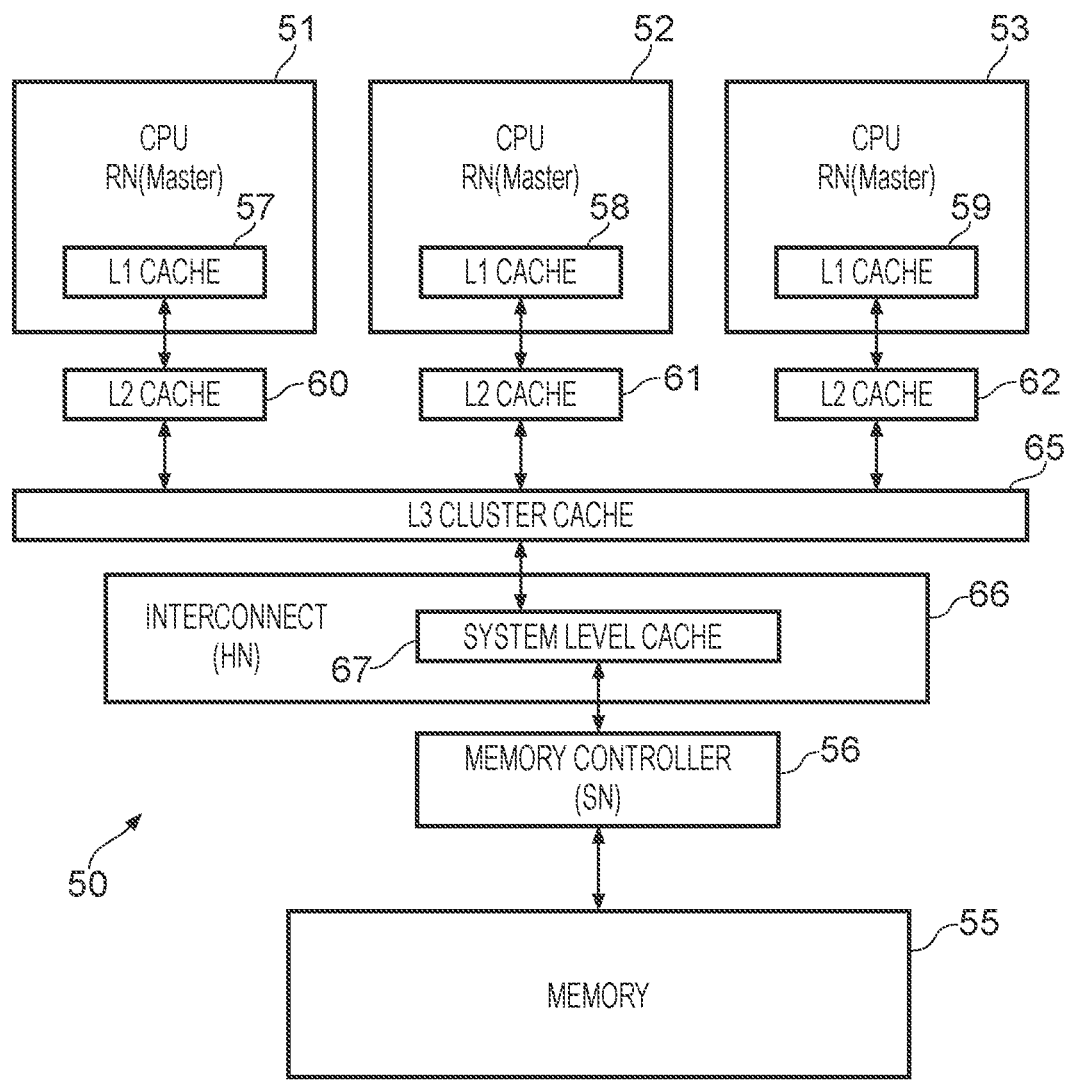
FIG. 4 schematically illustrates a data processing system comprising multiple cache levels according to some embodiments.

FIG. 4 schematically illustrates a data processing system 50 in some example embodiments. In this example three CPU devices 51, 52, 53 are shown each of which is labelled as "RN (master)", indicating that these master devices are "request nodes" in the system. These master devices perform their data processing operations with respect to data values which have been retrieved from the memory 55 which forms part of the data processing system 50. Access to the memory 55 is performed under the control of the memory controller 56, which (labelled "SN") is a "slave node" in the system. The CPUs 51, 52, 53 each have their own internal L1 caches 57, 58, 59 and further their own associated L2 caches 60, 61, 62. The CPUs share the L3 cluster cache 65 via which they are connected to the interconnect 66. The interconnect 66 is labelled as "HN" indicating that it is a home node in the system. The interconnect 66 also comprises the system level cache 67. It will be appreciated by one of ordinary skill in the art therefore that the L1 caches, the L2 caches, the L3 cluster cache, and the system level cache 66 thus represent a cache hierarchy and data values retrieved from the memory 55 may result in copies of that data value being cached in any or all of the respective levels of this cache hierarchy. Further, the CPUs 51, 51, 53 are provided in the system 50 in accordance with the present techniques and therefore for example as represented in FIG. 1A. That is to say that each of these master devices 51-53 is arranged to generate transactions which are conveyed by the interconnect 66 to a specified target, such as the memory controller 56. The CPUs 51-53 are in particular arranged to generate all-zero-data write transactions according to the present techniques which specify a data storage location (e.g. within the memory 55). Upon reception of such an all-zero-data write transaction, the memory controller 56 is arranged to cause the specified data storage location to be written to with all zeros, thus clearing that storage location. Further, in the context of a data processing system 50 as schematically illustrated in FIG. 4, it should be understood that a data write issued by one of the masters 51, 52, 53, specifying a data storage location in the memory 55, may cause a number of write operations to be performed with respect to the multiple cache levels intervening between the master and the slave memory device. For example taking the cache line size to be 64 bytes, a full cache line write with zero data to a specified location in the memory 55 will result in: the L1 cache 59 performing a write operation with 64 bytes of zero data to the L2 cache 62; the L2 cache 62 performing the same write operation to the L3 cluster cache 65; the L3 cluster cache 65 performing the same write operation to the system level cache 67; and the system level cache 67 performing the same write operation to the memory controller 56. Thus expounded, it will be appreciated that if each of these write operations requires 64 bytes of zero data to be transferred as part of the respective write transaction between each of the cache levels and then finally to the memory controller, this imposes a non-trivial burden on the data bandwidth capabilities of the data processing system 50. This is then to be contrasted with the all-zero-data write transaction disclosed herein, which only requires the respective caches to transmit the all-zero-data write transaction to the next cache level and finally to the memory controller, with no explicit data needing to be transferred. The potential burden on the data bandwidth capability of the data processing system is thus reduced. Further, where the data processing apparatus may be provided in a context in which power consumption is a concern (and noting that contemporary data buses may say have 256-bit width data buses on the interconnect), avoiding the need to use the data buses provided within the system may mean that the power saving can be significant.

Figure 5:
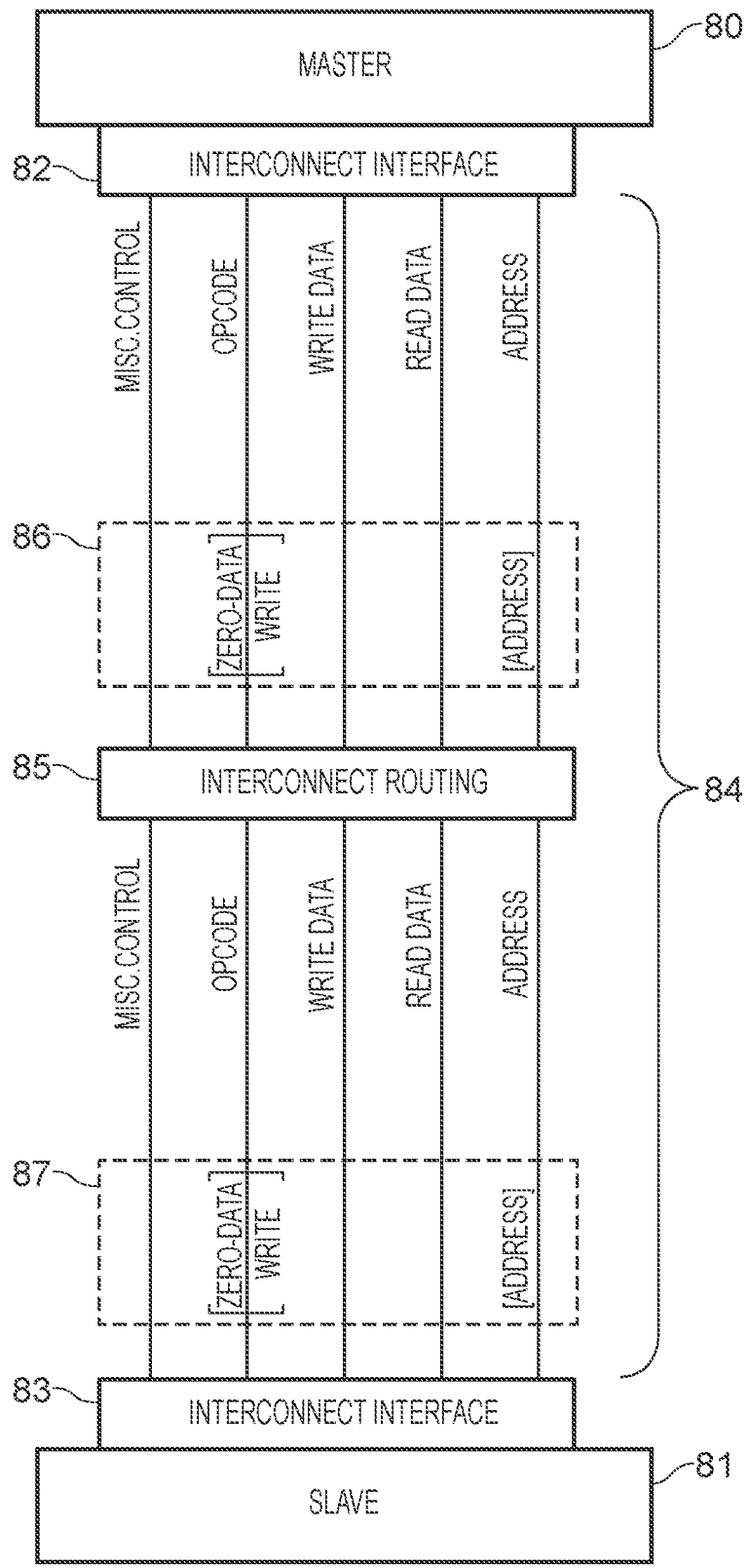
FIG. 5 schematically illustrates example channels used in the interconnect of some embodiments.

FIG. 5 schematically illustrates a master device 80 and a slave device 81, which are connected via interconnect 84. Each of the master 80 and the slave 81 connects to the interconnect 84 via its own interconnect interface 82 and 83 respectively. Generally the interconnect may be provided in a variety of ways and consists of various interconnect routing 85 providing the required connections between the interconnect interface 82 of the master 80 and the interconnect interface 83 of the slave 81. The interconnect 84 in FIG. 5 schematically represents everything between the interconnecting interface 82 and the interconnect interface 83. Of particular relevance to the present discussion are the selection (merely exemplary) of channels shown in FIG. 5 which comprise a miscellaneous control channel, an opcode channel, a write data channel, a read data channel, and an address channel. Accordingly it will be understood that each of these channels is multi-bit, the particular number of bits of each channel depending on its function. For example the opcode channel needs to be wide enough to communicate the number of unique transactions indicated by a specific opcode in the defined protocol of the interconnect which the master 80 and slave 81 use to communicate with one another, whilst the read and write data buses may be considerably larger, for example in a contemporary system each may be a 256-bit data bus. The address bus may for example be 32-bit or 64-bit in a contemporary implementation, but the present techniques are in no way limited to a particular address size. The transactions carried by the interconnect 84 are embodied as a coordinated set of signals carried by the respective channels and the example transactions 86 and 87 shown in FIG. 5 demonstrate that all that is required for the all-zero-data writes transactions of the present techniques to be conveyed is the combination of an appropriate opcode asserted on the opcode channel and the specified data storage location, e.g. by means of an address, specified on the address channel. Importantly, note that the data buses and in particular the write data bus is inactive (or at least ignored) in the context of an all-zero-data write transition. Thus, the master 80 can issue an all-zero-data write transaction from its interconnect interface 82 onto the interconnect 84 and this is conveyed via the interconnect routing 85 to the interconnect interface 83 of the slave 81. In response the slave 81 will write all-zero-data at the specified storage location(s). The slave 81 may also return one or more acknowledgement signals to the master 80, as will be discussed in more detail below with reference to 6A and 6B.

Figure 6A:
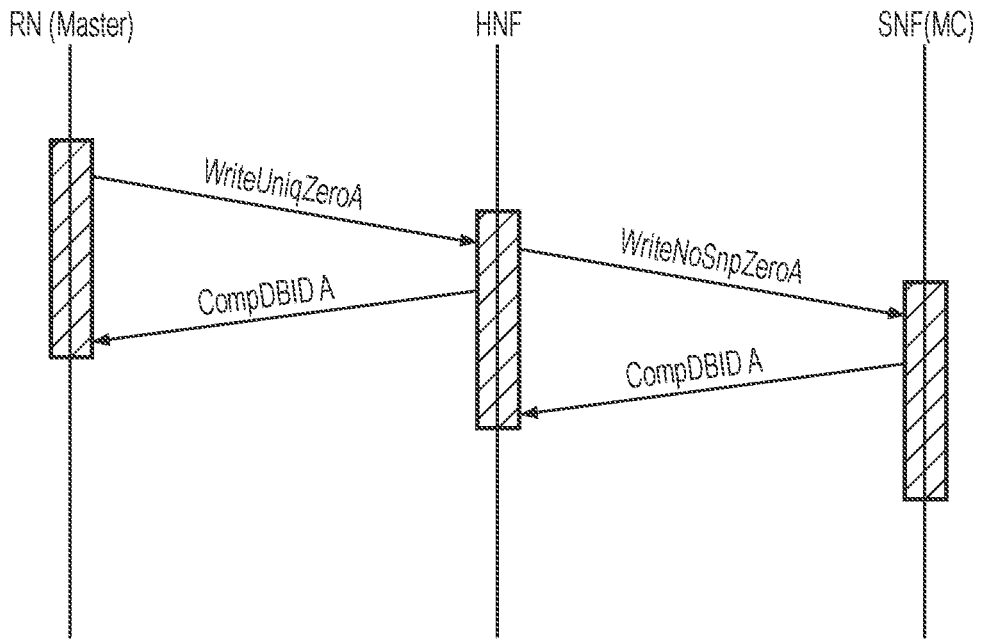
FIGS. 6A and 6B schematically illustrate a master issuing an c to a target slave device, where the transaction is conveyed via a home node, according to some embodiments.
Figure 6B:
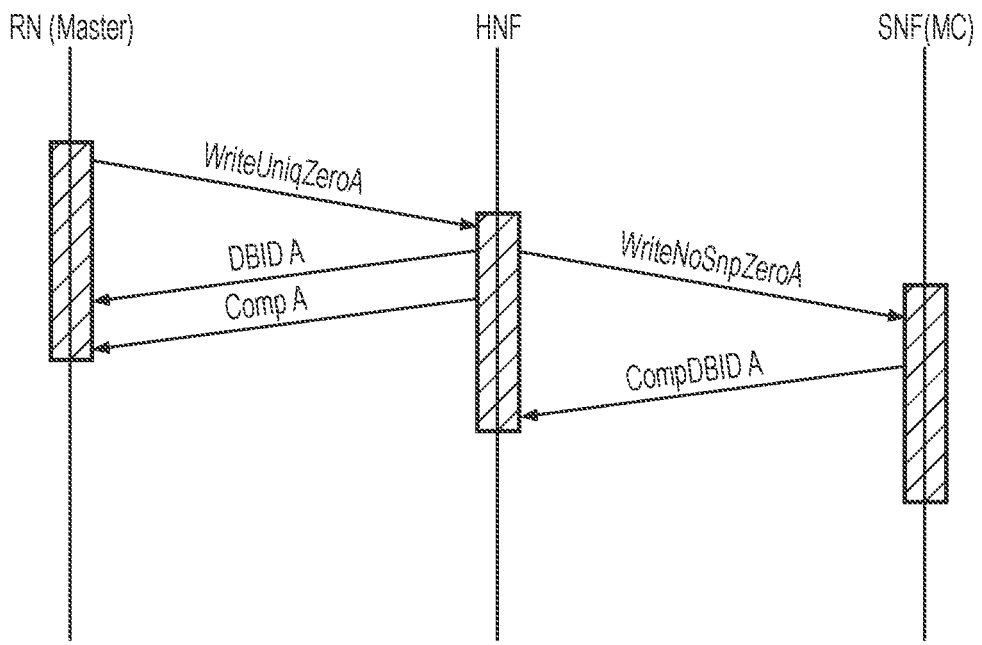

FIGS. 6A and 6B show sets of transactions that may be exchanged between devices in a data processing system according to the present techniques in some embodiments. A requesting node (RN) master in the example of FIG. 6A transmits an all-zero-data write transaction specifying a memory controller (MC), which is a slave node within the system, as its target. This transaction passes via the home node (HN) and in the example of FIG. 6A two different types of all-zero-data write transaction are used. The first, WriteUniqZero is the transaction sent from the master to the home node, and the second, WriteNoSnpZero is used between the home node and the memory controller slave node. These two different types of zero-data write transaction have different effects with respect to the cache coherency protocol which the data processing system respects. The WriteUniqZero indicates that this is a coherent operation and accordingly reception of this command by the home node will cause any required cache coherency operations with respect to this specified data location to be carried out within the system, whilst the WriteNoSnpZero command is non-coherent and does not trigger any snoop operations. The home node uses the WriteNoSnpZero command with respect to the memory controller slave node because the memory controller is beyond the point of coherency (the home node) and as such coherency operations are not required for this "last leg" step in the system to a slave node. In each case the recipient of the transaction responds with an acknowledgment, the home node returning the CompDBID acknowledgement signal to the master and the slave node returning the CompDBID acknowledgement signal to the home node.

FIG. 6B represents an alternative in the acknowledgments which may be sent when the same transactions are initiated by the master device, namely where in response to the WriteUniqZero command from the master the home node separately returns first a DBID acknowledgement signal and then a Comp acknowledgement signal. In this example the slave node only returns a combined compDBID acknowledgement signal to the home node.

From either of FIGS. 6A and 6B it can also be seen that the transaction transmission and acknowledgment exchange is usefully compact. This has further benefits for data tracking logic in the master, i.e. the components of the master required to track the issuance and completion of data modifying commands. In the example of FIGS. 6A and 6B the master must wait before taking any actions contingent on the completion of the all-zero-data write transaction until the Completion with Data Buffer ID (CompDBID) is received in the case of FIG. 6A or until the Data Buffer ID (DBID) and the Completion (Comp) are received in the case of FIG. 6B. These can be promptly received by the master in response to the all-zero-data write transaction and hence the master can deallocate the relevant entry in its address tracker promptly. This is to be compared to explicit data write transactions which provide data to be written on a data channel, in which the master holds write data in an outgoing data buffer and can only deallocate data buffer once it receives the DBID or CompDBID and has driven the write data onto the data channel. If the data bus is busy (which can easily happen when lots of masters are driving data), the master (RN) has to wait to finish the data tenure, leading to longer entry lifetimes in the data tracker logic.

Figure 7:
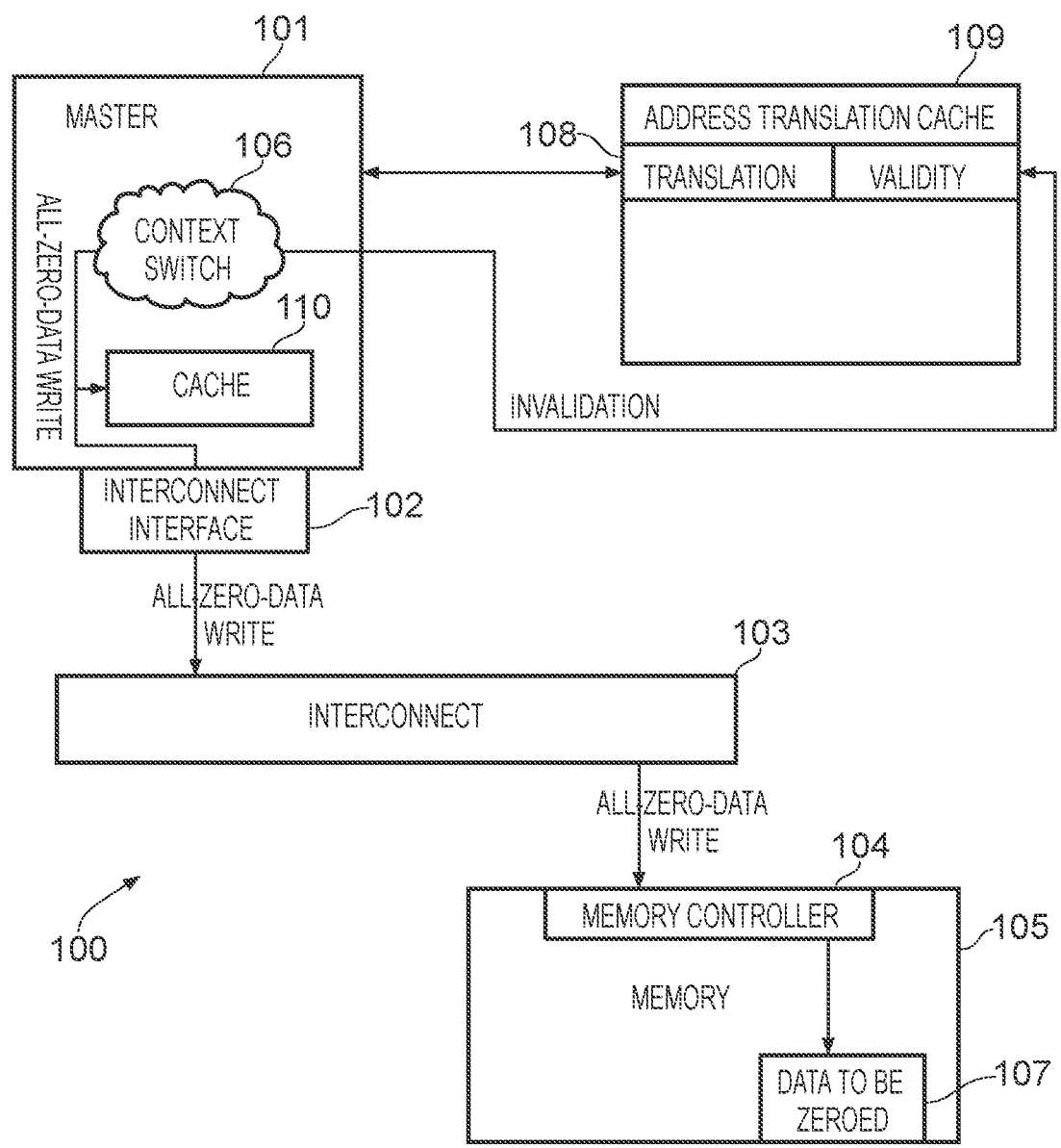
FIG. 7 schematically illustrates a data processing system in which a master device references an address translation cache when performing its data processing operations and invalidates an entry of the address translation cache upon a context switch in some example embodiments.

FIG. 7 schematically illustrates a data processing system 100 in some example embodiments. A master device 101 is illustrated coupled via its interconnect interface 102 to an interconnect 103 which further connects to the memory controller 104 forming part of the memory 105. The master device 101 performs data processing operations in a defined context, where this "context" may have a number of meanings within the generality of the illustration of FIG. 7. For example this may correspond to a process switch, such that the schematically illustrated context switch 106 represents a switch between processes. It may relate to the multi-threaded operation of the data processing operation carried out by the master 101, such that the schematically context switch 106 represents a switch between threads. However in other examples the context switch corresponds to a switch to a virtual machine, i.e. where a virtual machine which may be hosted on the master 101 is invoked and begins its data processing operations. In other examples the context switch 106 may be a switch from a secure context to a non-secure context, for example where the data processing apparatus 101 is arranged to perform data processing operations within carefully defined security domains, where components operating within the non-secure domain are prevented from accessing data belonging to the secure domain. Accordingly, the switch may be from a secure context to a non-secure context. The master 101 is arranged to issue an all-zero-data write transaction specifying the data location 107 of data which has been accessed in the context preceding the context switch. When the data storage location specified in the all-zero-data write transaction currently has an entry in the cache 110, this is cleaned (and zeroed). Also, the master also responds to the context switch by causing at least one corresponding entry 108 in the address translation cache 109 to be invalidated. The address translation cache 109 may for example be a translation lookaside buffer (TLB). Thus, when the context switch 106 occurs within the master 101, not only is the data stored in the cache 110 zeroed by the all-zero-data write, the data in the original storage location 107 of that data is also zeroed (and any intervening cache levels (not shown) are also cleaned), but further the entry in the address translation cache 109 corresponding to this data storage location is invalidated, such that the data belonging to the previous context is both cleared and invalidated before the handover to the subsequent context.

Figure 8:
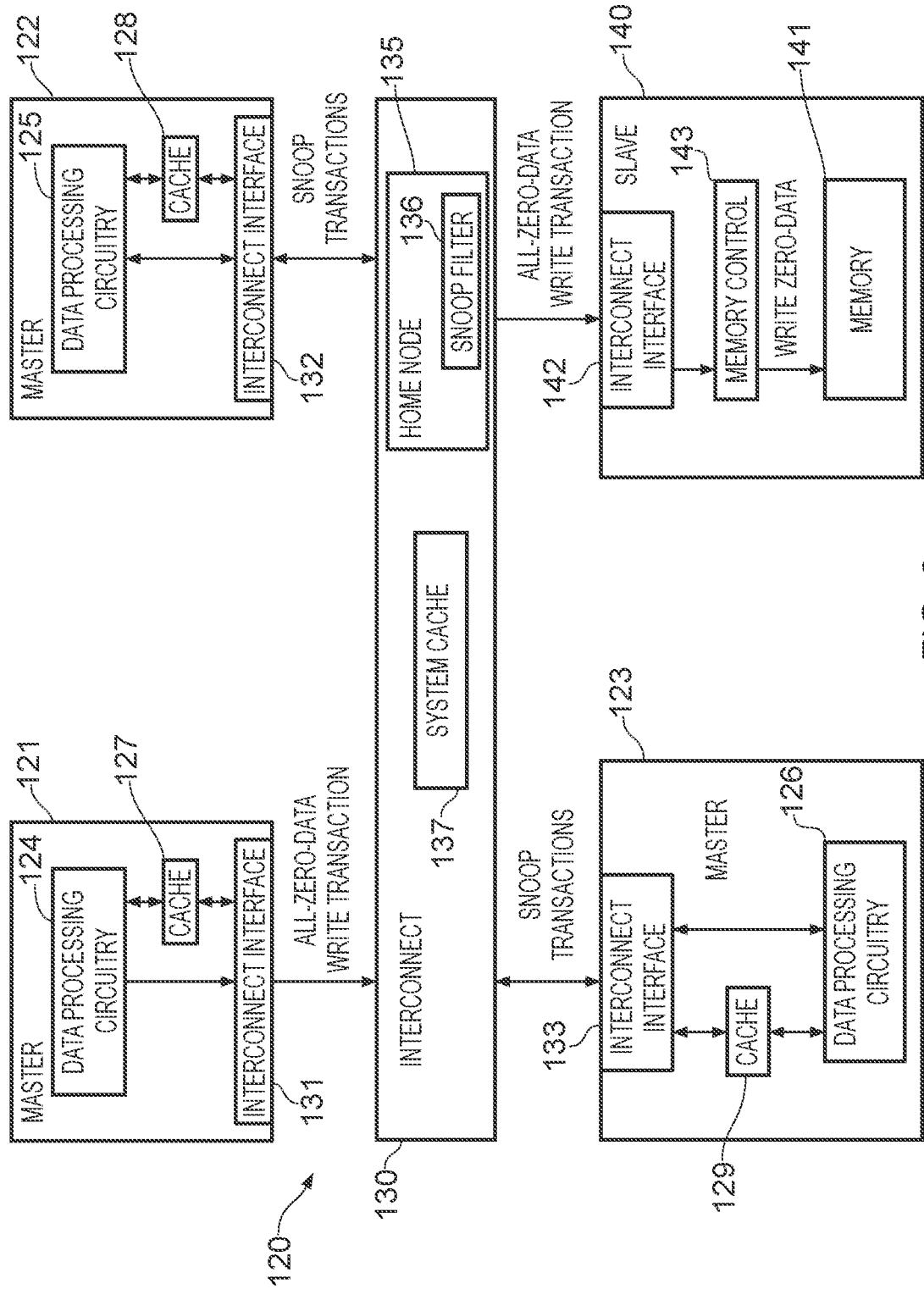
FIG. 8 schematically illustrates a data processing system in which snoop operations are carried out in some example embodiments.

FIG. 8 schematically illustrates a data processing system 120 in some embodiments. Here the data processing system is shown to comprise three master devices 121, 122, 123. Each of these comprises data processing circuitry 124, 125, 126 respectively and an internal cache 127, 128, 129. Each master is connected to the interconnect 130 via its interconnect interface 131, 132, 133. The interconnect 130 comprises a home node 135 which has snoop circuitry filter 136. The interconnect also comprises system cache 137. The example situation is shown in FIG. 8 of the master 121 issuing an all-zero-data write transaction to the interconnect 130 which specifies a data storage location in the slave device 140 as its target, where the data storage location within the memory 141, which forms part of the slave device 140. Thus the interconnect 130 conveys the transaction to the interconnect interface 142 of the slave device 140 and from there it is received by the memory controller circuitry 143. In response the memory controller 143 causes the specified data storage location(s) to be zeroed in the memory 141. In the example of FIG. 8 the all-zero-data write transaction which is first transmitted from the master 121 to the home node 135 is a cache coherent transaction (as in the example of the WriteUniqZero transaction of FIG. 6A), such that on receipt by the home node 135 the snoop circuitry 136 of the home node 135 in activated to cause various cache coherency operations (snoop transactions) to be carried out with respect to the other master devices 122 and 123 in the system. In particular, the all-zero-write transaction will cause any copies of data from the specified data storage location(s) held in the caches 128 and 129 of the masters 122 and 123 to be cleared (zeroed). The second stage of the transaction transmitted from the home node 135 to the save 140 is a non-coherent transaction (as in the example of the WriteNoSnpZero transaction of FIG. 6A), such that this transaction does not trigger any cache coherency operations (snoop transactions) in the system.

Figure 9A:
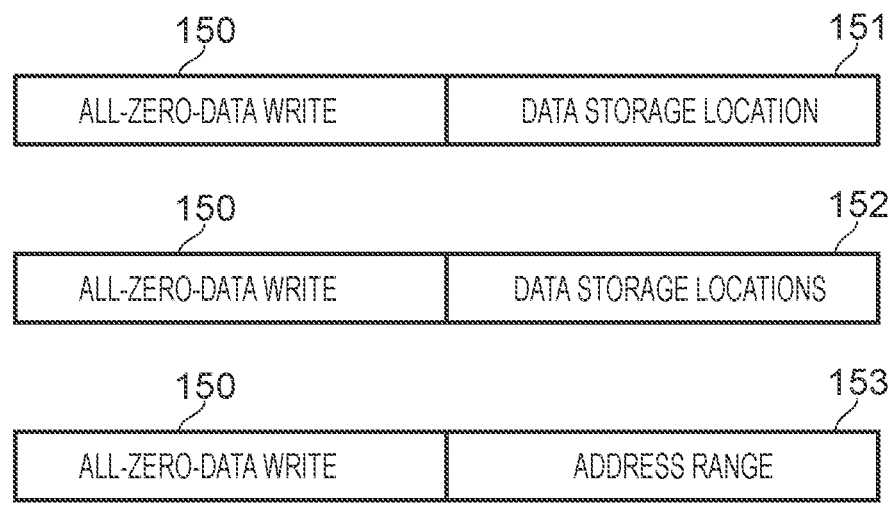
FIG. 9A shows various manners of data storage location specification for all-zero-data write transactions in some embodiments.

FIG. 9A shows three examples of the manner in which one or more data storage locations may be specified in an all-zero-data write transaction. The first all-zero-data write transaction comprises an all-zero-data write transaction opcode 150 and a single data storage location 151. The second all-zero-data write transaction comprises an all-zero-data write transaction opcode 150 and multiple data storage locations 152. These may be individually specified, or defined in any other manner which the transaction has the encoding space to represent. The third all-zero-data write transaction comprises an all-zero-data write transaction opcode 150 and an address range 153. This address range may for example be specified by a lower and an upper limit on the range, it may be specified by a base address and a range size, or in any other manner which the transaction has the encoding space to represent. Whichever of these example transactions is used, the recipient responds by writing all-zero data to (all of) the data location(s) specified.

Figure 9B:
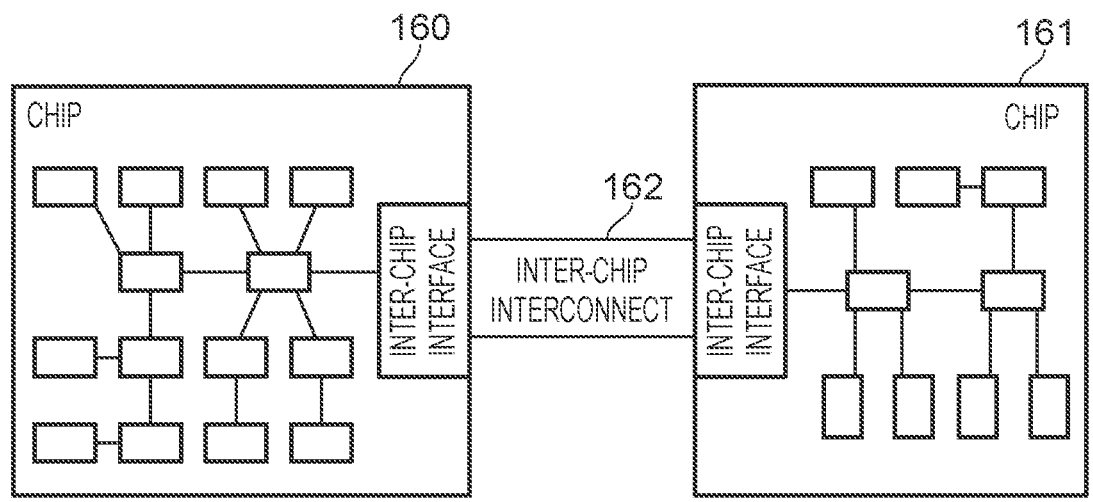
FIG. 9B schematically illustrates a multi-chip system in which an all-zero-data write transaction may be sent between component chips in some embodiments.

FIG. 9B schematically illustrates a multi-chip system in which a first chip 160 communicates with a second chip 161 via an inter-chip interconnect 162. Each chip can be seen to itself comprise multiple interconnected devices (which may be arranged in the manner of any of the data processing system described elsewhere herein). Communications across the inter-chip interconnect 162 comprise the all-zero-data write transactions described herein. In this context it is in particular to be noted that in an off-chip protocol it may be the case that the request, response, data, and snoop channels all share one physical channel for the communication between chips, and hence the all-zero-data write transactions of present techniques can have particular applicability when seeking to avoid shared bandwidth pressure when remote memory needs to be cleared.

Figure 10:
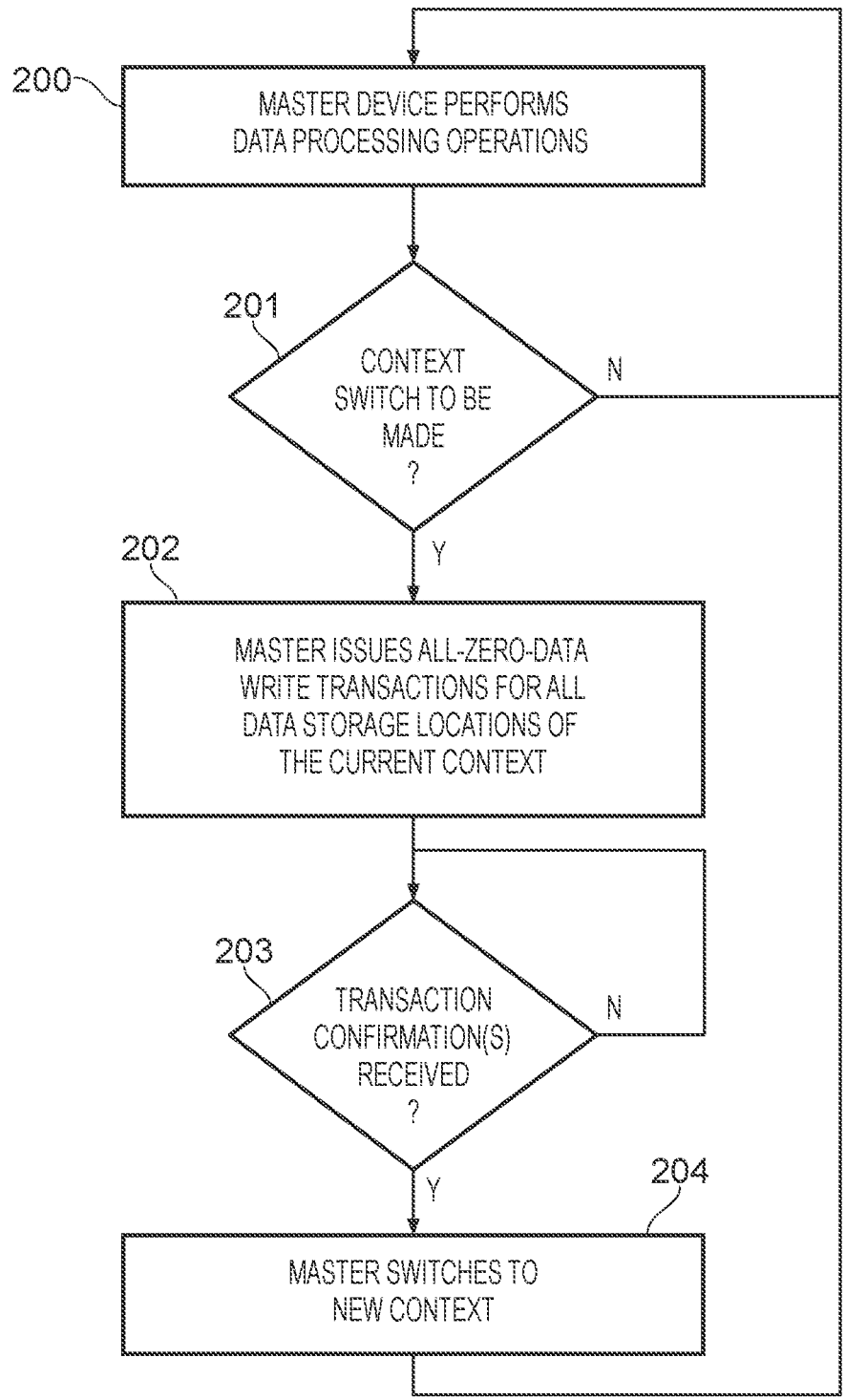
FIG. 10 is a sequence of steps which are taken in the method of some embodiments when a master device undergoes a context switch.

FIG. 10 is a flow diagram showing a sequence of steps which are taken by a master device according to some embodiments. The flow can be considered to begin at step 200, where the master devices is performing data processing operations. It is determined at step 201 if a context switch is to be made. If it is not then the flow returns to step 200. When a context switch is determined to be made at step 201 then the flow proceeds to step 202, where the master issues at least one all-zero-data write transaction for all data storage locations which have been used in the current context. The flow then proceeds to step 203, where the master determines if respective transaction confirmation(s) has/have been received. Until this is the case the flow waits at step 203. Finally when all such transaction confirmations have been received the flow proceeds to step 204 and the master switches to the new context where it is then known that the data has been cleaned to memory before the new context takes over.

Figure 11:
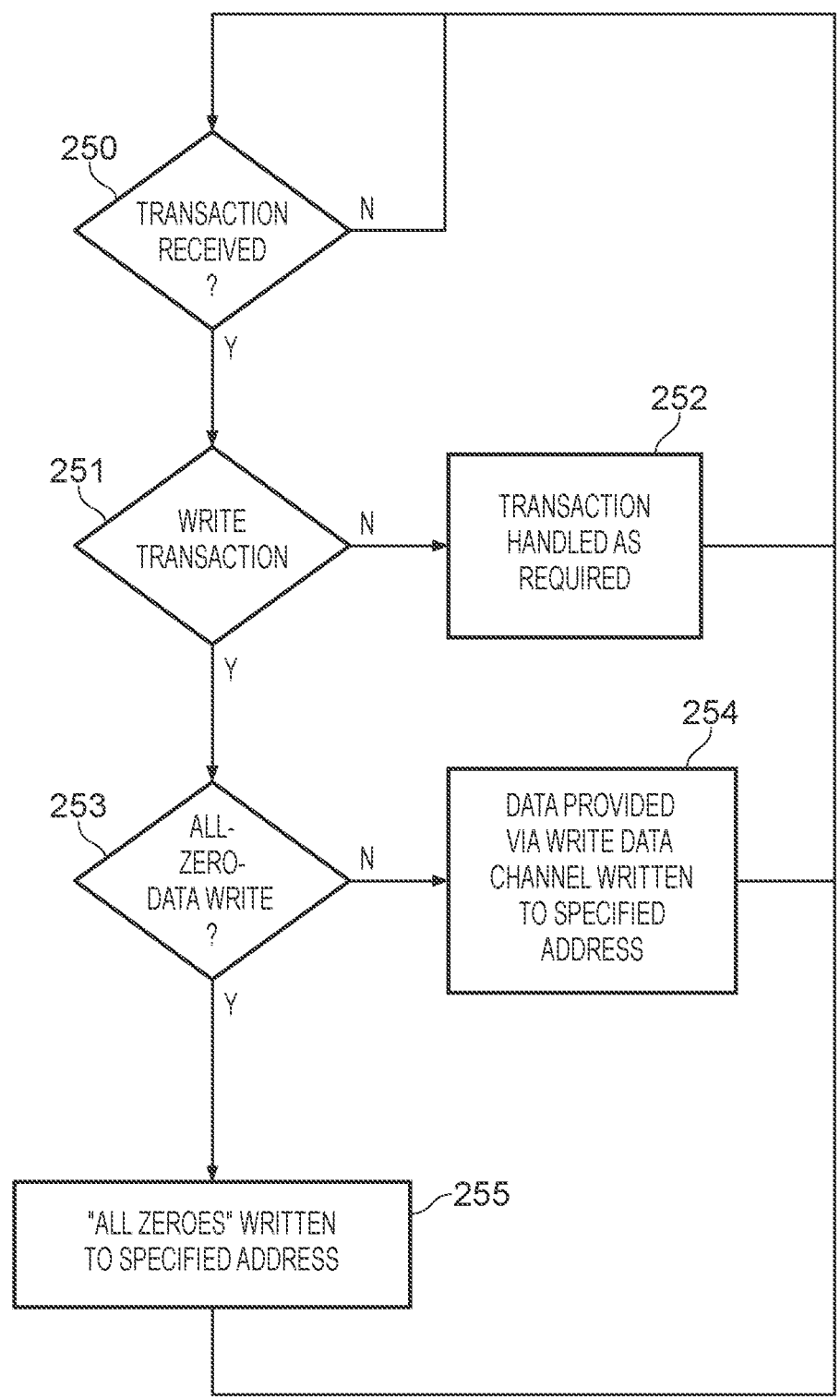
FIG. 11 is a flow diagram showing a sequence of steps which are taken according to the method of some embodiments when a slave device receives transactions including an all-zero-data write transaction in some example embodiments.

FIG. 11 shows a sequence of steps which are carried out according to some embodiments in a slave device. The flow can be considered to begin at step 250 where it is determined if a transaction has been received from the interconnect. Whilst it has not the flow waits at this step. When a transaction is received from the interconnect, at step 251 it is determined whether it is a write transaction and if it is not then at step 252 this other type of transaction is handled as required (no detail being given here as this is not the focus of the present discussion). However when this is a write transaction, at step 253 it is determined if this is an all-zero-data write. If it is not then at step 254 the data provided via the write data channel connected to the slave device is written to the address specified in the write transaction and the flow returns to step 250. However if this is all-zero-data write transaction the flow proceeds via step 255, where all-zeros are written to the specified address (i.e. the write data channel is ignored). The flow then returns to step 250.

In brief overall summary apparatuses, methods of operating apparatuses, interconnects for connecting apparatuses to one another, and methods of operating the interconnects are disclosed. A master apparatus can issue an individual all-zero-data write transaction specifying a data storage location to the interconnect, which conveys the individual all-zero-data write transaction to a target device which writes all-zero-data at the data storage location. No write data is conveyed with the individual all-zero-data write transaction, so that the individual all-zero-data write transaction may be used to clear the data storage location without adding to congestion of a write data channel in the interconnect.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

We claim:

1. Apparatus comprising:
an interconnect interface; and
interconnect protocol signal generation circuitry, wherein:
the interconnect protocol signal generation circuitry is arranged to provide an individual all-zero-data write transaction specifying a data storage location comprising at least one memory address defining a memory region of a target device controlled by a memory controller to the interconnect interface,
the interconnect interface is responsive to provision of the individual all-zero-data write transaction to cause transmission of the individual all-zero-data write transaction via an interconnect to the target device which comprises the data storage location to cause the target device to write all-zero-data at the data storage location,
the interconnect is configured to carry read transactions, write transactions, and data coherency commands between a plurality of devices, and
the apparatus further comprises data processing circuitry to perform data processing operations comprising access to the data storage location, and
when the data processing operations undergo a context switch from a first context to a second context the data processing circuitry is responsive to the context switch to control the interconnect protocol signal generation circuitry to provide the individual all-zero-data write transaction specifying the data storage location to the interconnect interface.

2. The apparatus as claimed in claim 1, wherein the data processing operations of the first context comprise access to multiple data storage locations, and
wherein when the data processing operations undergo the context switch from the first context to the second context the data processing circuitry is responsive to the context switch to control the interconnect protocol signal generation circuitry to provide one or more individual all-zero-data write transactions specifying the multiple data storage locations to the interconnect interface.

3. The apparatus as claimed in claim 1, wherein the context switch comprises at least one of:
a process switch;
a thread switch;
a switch to a virtual machine; and
a switch from a secure context to a non-secure context.

4. The apparatus as claimed in claim 1, wherein the interconnect protocol signal generation circuitry is arranged to provide the individual all-zero-data write transaction specifying a set of memory addresses which comprises the data storage location.

5. The apparatus as claimed in claim 4, wherein the set of memory addresses corresponds to a cache line which comprises the data storage location.

6. The apparatus as claimed in claim 1, wherein the interconnect protocol signal generation circuitry is arranged to provide the individual all-zero-data write transaction specifying a memory address range which comprises the data storage location.

7. The apparatus as claimed in claim 1, wherein the data processing circuitry is arranged to access the data storage location in the data processing operations in dependence on an address translation definition in an address translation cache,
and wherein the data processing circuitry is further responsive to the context switch to cause the address translation definition for the data storage location to be invalidated.

8. The apparatus as claimed in claim 1, wherein the interconnect protocol signal generation circuitry is arranged to provide the individual all-zero-data write transaction as an individual all-zero-data write-unique transaction specifying the data storage location to the interconnect interface,
and wherein the interconnect interface is responsive to provision of the individual all-zero-data write-unique transaction to cause transmission of the individual all-zero-data write-unique transaction via the interconnect to the target device to cause snoop operations in the interconnect to be carried out with respect to any copies of data from the data storage location which are held in other devices connected to the interconnect.

9. The apparatus as claimed in claim 1, wherein the interconnect protocol signal generation circuitry is arranged to provide the individual all-zero-data write transaction as an individual all-zero-data write-no-snoop transaction specifying the data storage location to the interconnect interface, and wherein the interconnect interface is responsive to
provision of the individual all-zero-data write-no-snoop transaction to cause transmission of the individual all-zero-data write-no-snoop transaction via the interconnect to the target device without triggering snoop operations in the interconnect.

10. The apparatus as claimed in claim 1, wherein the interconnect protocol signal generation circuitry is arranged to provide the individual all-zero-data write transaction by asserting a predetermined opcode amongst signals provided to the interconnect interface.

11. An interconnect system comprising:
a master device;
an interconnect to carry read transactions, write transactions, and data coherency commands between a plurality of devices; and
a slave device,
wherein:
the interconnect is responsive to reception from the master device of an individual all-zero-data write transaction specifying a data storage location comprising at least one memory address defining a memory region of the slave device controlled by a memory controller to convey the individual all-zero-data write transaction to the slave device to cause the slave device to write all-zero data at the data storage location;
the interconnect system further comprises an intermediate hub device coupled to the interconnect;
the interconnect is responsive to reception from the master device of the individual all-zero-data write transaction to convey the individual all-zero-data write transaction to the intermediate hub device;
the intermediate hub device is responsive to reception from the master device of the individual all-zero-data write transaction to convey the individual all-zero-data write transaction to the slave device; and
the master device is arranged to provide the individual all-zero-data write transaction as one of:
an individual all-zero-data write-unique transaction specifying the data storage location, wherein the intermediate hub device is responsive to reception from the master device of the individual all-zero-data write-unique transaction to participate in snoop operations in the interconnect with respect to any copies of data from the data storage location which are held in other devices connected to the interconnect; and
an individual all-zero-data write-no-snoop transaction specifying the data storage location, wherein the intermediate hub device is responsive to reception from the master device of the individual all-zero-data write-no-snoop transaction to transmit the individual all-zero-data write-no-snoop transaction via the interconnect to the slave device without triggering snoop operations in the interconnect.

12. The interconnect system as claimed in claim 11, wherein the intermediate hub device is responsive to reception from the master device of the individual all-zero-data write-unique transaction to transmit the individual all-zero-data write-no-snoop transaction via the interconnect to the slave device.

13. The interconnect system as claimed in claim 11, wherein the interconnect forms a component interconnect of at least one of:
a mesh interconnect topology;
an intra-chip communication link; and
an inter-chip communication link.

14. A method of operating an interconnect system comprising the steps of:
receiving in an interconnect an individual all-zero-data write transaction from a master device specifying a data storage location comprising at least one memory address defining a memory region of aa slave device controlled by a memory controller; and
conveying the individual all-zero-data write transaction to the slave device to cause the slave device to write all-zero data at the data storage location,
wherein the interconnect is configured to carry read transactions, write transactions, and data coherency commands between a plurality of devices;
responding, at the interconnect, to reception from the master device of the individual all-zero-data write transaction by conveying the individual all-zero-data write transaction to an intermediate hub device coupled to the interconnect;
responding, at the intermediate hub device, to reception from the master device of the individual all-zero-data write transaction by conveying the individual all-zero-data write transaction to the slave device; and
providing, by the master device the individual all-zero-data write transaction as one of:
an individual all-zero-data write-unique transaction specifying the data storage location, wherein the intermediate hub device is responsive to reception from the master device of the individual all-zero-data write-unique transaction to participate in snoop operations in the interconnect with respect to any copies of data from the data storage location which are held in other devices connected to the interconnect; and
an individual all-zero-data write-no-snoop transaction specifying the data storage location, wherein the intermediate hub device is responsive to reception from the master device of the individual all-zero-data write-no-snoop transaction to transmit the individual all-zero-data write-no-snoop transaction via the interconnect to the slave device without triggering snoop operations in the interconnect.

15. A method of operating an apparatus comprising data processing circuitry to perform data processing operations, the method comprising the steps of:
generating an individual all-zero-data write transaction specifying a data storage location comprising at least one memory address defining a memory region of a target device controlled by a memory controller;
providing the individual all-zero-data write transaction to an interconnect interface; and
transmitting the individual all-zero-data write transaction via an interconnect to the target device which comprises the data storage location to cause the target device to write all-zero-data at the data storage location, wherein the interconnect is configured to carry read transactions, write transactions, and data coherency commands between a plurality of devices, and wherein the data processing operations comprise access to the data storage location; and when the data processing operations undergo a context switch from a first context to a second context responding, with the data processing circuitry, to the context switch to control the interconnect protocol signal generation circuitry to provide the individual all-zero-data write transaction specifying the data storage location to the interconnect interface.

16. The apparatus as claimed in claim 1, wherein the individual all-zero-data write transaction specifies the data storage location but does not explicitly provide the all-zero-data.

17. Apparatus comprising:
an interconnect interface; and
interconnect protocol signal generation circuitry,
wherein:
the interconnect protocol signal generation circuitry is arranged to provide an individual all-zero-data write transaction specifying a data storage location comprising at least one memory address defining a memory region of a target device controlled by a memory controller to the interconnect interface, the interconnect interface is responsive to provision of the individual all-zero-data write transaction to cause transmission of the individual all-zero-data write transaction via an interconnect to the target device which comprises the data storage location to cause the target device to write all-zero-data at the data storage location, the interconnect is configured to carry read transactions, write transactions, and data coherency commands between a plurality of devices, and the interconnect protocol signal generation circuitry is arranged to provide the individual all-zero-data write transaction as one of:

an individual all-zero-data write-unique transaction specifying the data storage location to the interconnect interface, wherein the interconnect interface is responsive to provision of the individual all-zero-data write-unique transaction to cause transmission of the individual all-zero-data write-unique transaction via the interconnect to the target device to cause snoop operations in the interconnect to be carried out with respect to any copies of data from the data storage location which are held in other devices connected to the interconnect; and an individual all-zero-data write-no-snoop transaction specifying the data storage location to the interconnect interface, wherein the interconnect interface is responsive to provision of the individual all-zero-data write-no-snoop transaction to cause transmission of the individual all-zero-data write-no-snoop transaction via the interconnect to the target device without triggering snoop operations in the interconnect.

* * * * *